Jan. 13, 1970    C. W. HART ET AL    3,490,035
MULTIVIBRATOR MAGNETOMETER WITH PULSE DURATION OUTPUT
Filed May 25, 1967

INVENTORS
CLIFTON W. HART
EUGENE E. ROSACKER

ATTORNEY

United States Patent Office 3,490,035
Patented Jan. 13, 1970

3,490,035
MULTIVIBRATOR MAGNETOMETER WITH
PULSE DURATION OUTPUT
Clifton W. Hart, Mound, and Eugene E. Rosacker, Richfield, Minn., assignors to Honeywell Inc., Minneapolis, Minn., a corporation of Delaware
Filed May 25, 1967, Ser. No. 642,666
Int. Cl. G01r 33/02
U.S. Cl. 324—43                                                3 Claims

ABSTRACT OF THE DISCLOSURE

A circuit for measuring the magnetic field strength at a point in space utilizing the method of saturating a core in only one direction and measuring the amount of flux change between its residual condition and the saturated condition.

---

The present invention is generally directed toward electronic circuitry and more specifically directed toward a magnetometer.

The prior art has many different types of magnetometers but most of these units are quite large, clumsy, bulky and heavy. The units which are somewhat smaller such as shown in an Electronics article on page 48 in the June 1, 1962 edition utilize differential winding sensing wherein the core is alternately driven from positive saturation to negative saturation so as to eliminate any effects of residual magnetism. However, the present invention relies on the residual magnetism as part of the invention.

Essentially, the residual magnetism of a toroidal core or any other magnetic element is dependent upon external magnetic field conditions. Thus, if the earth's magnetic field were to increase, the flux level in a core would increase from the level that it had previously been. Likewise, if the earth's field were to decrease, the total flux in the core with no current flowing through the windings will decrease. Therefore, the present invention periodically saturates the core and measures the amount of flux change through the use of a second or output winding which will provide an output pulse of an amplitude dependent upon the flux change and therefore indicative of the magnetic field conditions external to the core. The amplitude of the output signal will vary as a function of the field strength external to the core.

It is therefore an object of the present invention to provide an improved magnetic field measuring apparatus.

Other objects and advantages of the present invention will be apparent from a reading of the specification and appended claims in conjunction with the drawings, wherein:

Figure 1:
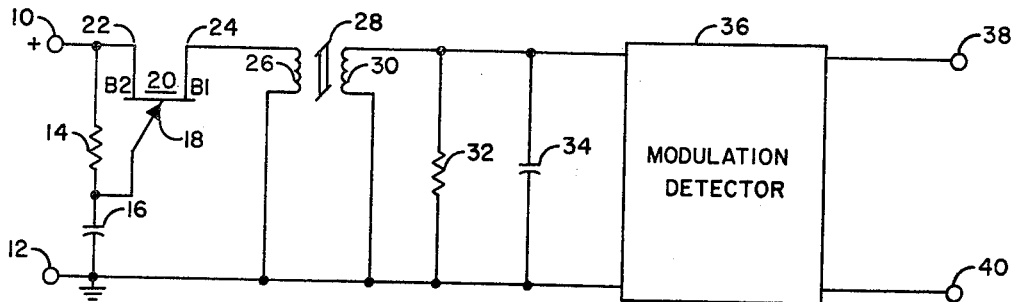
FIGURE 1 is a drawing of the simplest form of the invention.

In FIGURE 1, power is supplied between two terminals 10 and 12 wherein terminal 10 is positive with respect to terminal 12 and in most cases terminal 12 will be ground or reference potential. A resistor 14 is connected in series with capacitor 16 between terminals 10 and 12 while a junction point between these two components is connected to an emitter 18 of an unijunction transistor generally designated as 20 having first and second bases 24 and 22 respectively. Base 22 is connected to terminal 10 while base 24 is connected to one winding 26 of a magnetic toroidal core means generally designated as 28 and having a second winding 30. The other end of winding 26 is connected to terminal 12. A resistor 32 is connected in parallel with a capacitor 34 and the parallel combination is connected across the leads of winding 30 one end of which is connected to terminal 12. A modulation detector 36 is connected across the capacitor 34 and has output terminals 38 and 40. In most instances terminal 40 will be in common with terminal 12 and reference potential. The detector in most instances will contain a rectifying means or filtering means for changing the amplitude to a voltage level indicative of the amplitude of the external field. However, as is well known to those skilled in the art, many other methods of converting the output from the winding 30 to a more usable signal are available.

Figure 2:
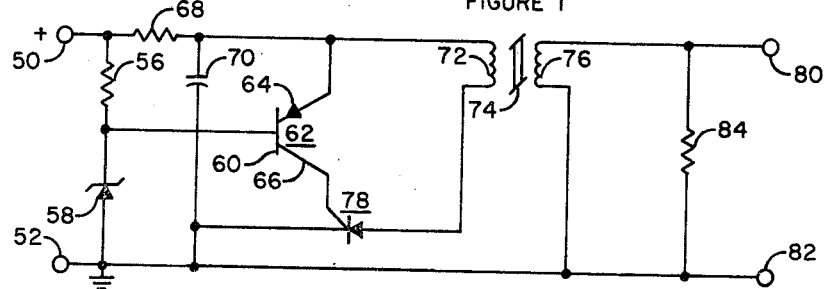
FIGURES 2–4 are schematic diagrams of other versions of the invention.

In FIGURE 2 input terminals 50 and 52 are connected respectively to positive power source and ground or reference potential 54. A resistor 56 is connected in series with a Zener diode 58 between terminals 50 and 52 with the anode of Zener diode 58 connected to ground 54. A junction between resistor 56 and diode 58 is connected to a base 60 of a PNP transistor, switch means or voltage sensing means generally designated as 62 and having an emitter 64 and a collector 66. A resistor 68 is connected in series with a capacitor 70 between terminals 50 and 52 with the capacitor connected to terminal 52. The emitter 64 is connected to a junction point between the resistor 68 and capacitor 70 and to one end of a winding 72 of a toroidal saturable magnetic core generally designated as 74 having a second winding 76. A silicon controlled rectifier or controlled switch means 78 hereinafter abbreviated as an SCR has an anode connected to the other end of winding 72 and a cathode connected to ground 54 while a gate thereof is connected to collector 66. The winding 76 is connected between ground 54 and an output terminal 80 while a second output terminal 82 is common with ground 54. A resistance means 84 is connected across the output terminals.

Figure 3:
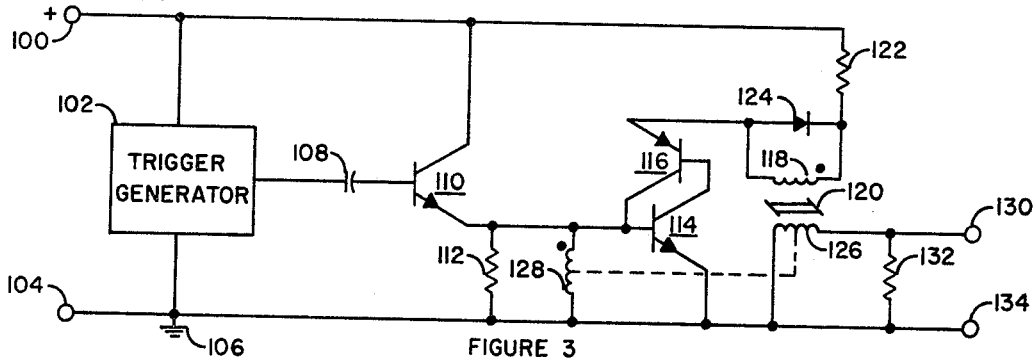

In FIGURE 3 a positive power source 100 is connected to supply power to a trigger generator generally designated as 102 which is further connected to a second terminal 104 in common with ground 106. Signals are supplied from trigger generator 102 through a capacitor 108 to a base of an NPN transistor, signal amplifying means or switch means generally designated as 110 having a collector connected to terminal 100 and an emitter connected through a resistor 112 to ground 106. The emitter of transistor 110 is also connected to a base of an NPN transistor or switch means generally designated as 114. An emitter of transistor 114 is connected to ground 106 while a collector thereof is connected to a base of a PNP transistor or switch means generally designated as 116 and having a collector thereof connected to the base of transistor 114. An emitter of transistor 116 is connected through a winding 118 of a saturable magnetic core means generally designated as 120 to terminal 100 through a resistance means 122. A diode 124 is connected in parallel with winding 118 with the anode connected to the emitter of transistor 116. Core 120 further has a winding 126 and a winding 128. Winding 128 is connected in parallel with resistor 112 while winding 126 is connected between ground 106 and an output terminal 130. A resistance means 132 is connected between output terminal 130 and ground 106. A second output terminal 134 is common with ground 106.

In FIGURE 4 a trigger generator again designated as 102 is connected between input terminals 100 and 104 as shown in FIGURE 3 and again as shown in FIGURE 3 ground is designated as 106 and is connected to input terminal 104. The trigger generator 102 supplies an output signal through a capacitor 108 to a base of a transistor generally designated as 110. Transistor 110 is an NPN transistor having an emitter thereof connected to ground 106 and a collector thereof connected through a winding 150 of a toroidal saturable magnetic core 152 to terminal 100. A diode 154 is connected in parallel with winding 150 with the cathode thereof connected to terminal 100. Saturable magnetic core 152 has a feedback winding 156 and an output winding 158. A resistor 160 is connected between ground 106 and one end of winding 156. A diode 162 is connected between the other end of winding 156 and the base of transistor 110. A diode 164 is connected between the base of transistor 110 and ground 106. Both diodes 162 and 164 have their cathodes connected together. Output terminals 166 and 168 are connected respectively to opposite ends of winding 158. As will be noticed, there is a dot on the end of winding 150 which is connected to terminal 100 and a dot on the end of winding 156 which is connected to the anode of diode 162. The dots, of course, indicate as in common magnetic terminology that these two points will have the same polarity or phase with respect to the other end of that winding.

The same designations were used in FIGURE 3 wherein the end of winding 118 which is connected to resistor 122 is dotted as is the end of winding 128 which is connected to the base of transistor 114.

OPERATION

Referring to FIGURE 1 it will be noted that the combination of resistor 14 and capacitor 16 provide an RC circuit. The capacitor 16 will charge to a value sufficient to actuate the uninjunction transistor 20. As is well known to those skilled in the art, a unijunction transistor will be actuated when the emitter voltage is more than half the voltage between the two bases. Thus, when capacitor 16 charges to more than half the supply voltage, the unijunction transistor 20 will be actuated and current will flow from capacitor 16, through emitter 18 to base 24 and through the winding 26 to ground 12. This will continue until capacitor 26 is discharged to a very low voltage. A time constant is picked such that the core 28 will always go into saturation. Thus, the amplitude of the output signal appearing across winding 30 is indicative of the total flux change between the residual magnetic level and the saturated level. As previously explained, the residual magnetic level is dependent upon the external magnetic field or in this case the earth's magnetic field. A frequency of approximately 800 hertz has been found to be an optimum frequency for one embodiment of the invention. The resistor 32 and capacitor 34 are utilized for the purpose of stabilizing the amplitude of the output signals such that momentary disturbances providing an increase in output signal are not transmitted to the detector 36. However, the change in amplitude provided by a passing vehicle containing ferro-magnetic material is sufficient to alter the amplitude of the output signal. As was previously mentioned, the detector may be any of many types and is merely utilized to place the output from the winding 36 in a more usable form such as a bi-directional voltage signal. Thus, if the magnetic field wherein the core 28 is situated increases in flux strength, the output will change proportionately, this will also occur if the magnetic field strength decreases. The output signal from winding 30 will be a complex wave form which includes the basic gate repetition signal as well as the time-rate signal of the ambient field disturbance.

The rest of the figures operate on a principle similar to that shown in FIGURE 1 but there are slight differences. The Zener diode 58 provides a voltage reference to the base of transistor 62 while the resistors 68 and capacitor 70 provide an RC time constant. Thus, the emitter 64 of transistor 62 is changed in voltage and will periodically be turned to an ON condition. When transistor 62 is turned ON, current will flow therethrough and through the cathode gate junction of SCR 78 to turn it ON. When SCR 78 is turned ON, current will flow from capacitor 70 through winding 72 and SCR 78 and will also flow from source 50 through these same two components. As is well known, an SCR once turned ON will stay ON until it is starved to an OFF condition through the lack of current flow therethrough. Also, an SCR will turn OFF when it is reverse biased. Actually, the reverse bias is substantially the same as starving an SCR. The capacitor 70 will discharge to a practically zero potential after core 74 saturates. The current flow left through SCR 78 due to that received from source 50 is so small that SCR 78 is starved to an OFF condition. Thus, the capacitor 70 can start charging again to repeat the cycle. The output winding 76 is shown with merely a resistor 84 connected thereacross as it would be completely obvious to one skilled in the art to add the capacitor 34 and the detector 36 as shown in FIGURE 1 if it were desired in FIGURE 2.

In FIGURE 3 a trigger generator 102 which may be an RC time constant circuit or any other source of pulsations for providing an actuation signal to transistor 110. Actuation of transistor 110 will provide a pulse to the transistor 114. As is known to those skilled in the art, the combination of transistors 114 and 116 in the manner shown will produce a silicon controlled switch or other controlled switch which may be turned OFF prior to starvation. The circuit connection is the same as for an SCR but is operated differently.

When the switch utilizing transistors 114 and 116 is turned to an ON condition, current will flow through winding 118. The pulse from trigger source 102 in this instance is a very short duration pulse and thus transistor 110 will turn OFF shortly. The feedback winding 128 will maintain 114 ON until saturation of the core 120 occurs. At saturation, the potential in winding 128 is lost and 114 and 116 turn OFF, thus interrupting the current flow through winding 118. The output winding 126 is treated in the same fashion as in FIGURE 2.

Figure 4:
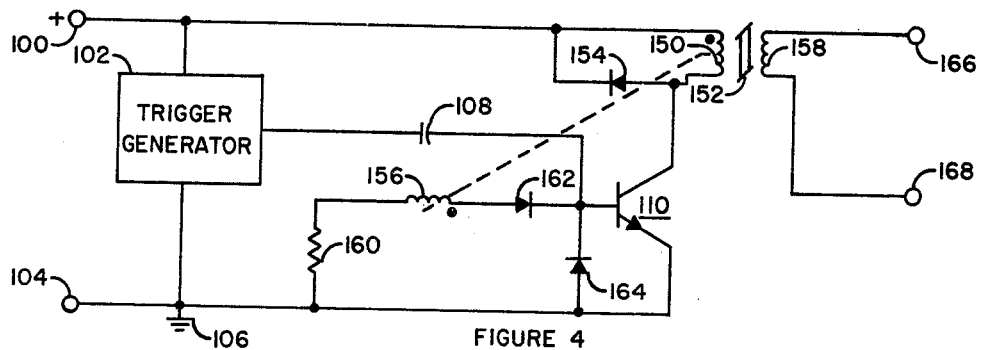

In FIGURE 4, the trigger 102 operates to provide a pulse to transistor 110 which turns ON. In this case the winding 156 operates in a feedback manner to keep transistor 106 to an ON condition until saturation of core 152 occurs. At saturation, winding 156 loses potential and in turn transistor 110 loses base drive, therefore turns OFF. The diode 162 will prevent the application of a negative going pulse. Again, the output winding 158 is treated the same as in FIGURE 2 wherein any type of detection apparatus can be connected thereacross to provide the usable output signal.

While four embodiments of the invention have been shown wherein the output changes in amplitude in response to changes in the environmental magnetic field, it is apparent to those skilled in the art that many other circuits may be designed which will accomplish the same end result. Therefore, we wish to be limited not by the specific embodiments shown but only by the scope of the appended claims wherein we claim:

1. A magnetometer for measuring ambient magnetic field utilizing a toroidal core normally in a residual saturation state comprising, in combination:
   means including an RC circuit for supplying periodically recurring pulses of a sufficient width to saturate a toroidal core;
   toroidal magnetic core means comprising only first and second windings for saturating only after current is applied through said first winding for a sufficient period of time wherein the time is variable depending upon the ambient magnetic field;
   unijunction transistor means connected in series with said first winding and connected to said signal means and to said terminal means for allowing current flow through said first winding upon receipt of a pulse from said means for supplying pulses and maintaining said current flow until the pulse is of a low voltage relative to a voltage across said unijunction transistor means; and
   means for providing an output indicative of current flow times in said first winding connected to said second winding.

2. A magnetometer for measuring ambient magnetic field utilizing a toroidal magnetic core normally in a residual saturation state comprising, in combination:
  resistive capacitor means for supplying periodically recurring pulses;
  toroidal magnetic core means comprising only first and second windings for saturating only after current is applied through said first winding for a sufficient period of time wherein the time is variable depending upon the ambient magnetic field;
  terminal means for supplying power to said resistive capacitor means; and
  switch means connected in series combination with said first winding and the combination connected in parallel with the capacitor portion of said first named means for permitting current flow from said capacitor portion through said first winding until said capacitor portion is substantially discharged, said second winding providing a pulse width modulated output signal indicative of magnetic field strength.

3. Apparatus as claimed in claim 2 wherein said switch means is an SCR which is starved into a condition to prevent current flow through said first winding.

References Cited

UNITED STATES PATENTS

| | | | |
|---|---|---|---|
| 3,281,670 | 10/1966 | Myers et al. | 324—43 X |
| 2,991,414 | 7/1961 | Tillman | 324—43 |
| 3,005,158 | 10/1961 | Spinrad | 332—12 |

OTHER REFERENCES

Millman et al., Pulse, Digital, and Switching Waveforms, McGraw-Hill, 1965, pp. 502–504 relied on.

RODNEY D. BENNETT, Jr., Primary Examiner

DANIEL C. KAUFMAN, Assistant Examiner

U.S. Cl. X.R.

307—273, 282, 309